United States Patent
Nakase

(10) Patent No.: US 9,565,360 B2
(45) Date of Patent: Feb. 7, 2017

(54) IMAGE DATA RECORDING APPARATUS CAPABLE OF RECORDING STILL AND MOVING IMAGES SIMULTANEOUSLY

(71) Applicant: CANON KABUSHIKI KAISHA, Tokyo (JP)

(72) Inventor: Yuichi Nakase, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/664,535

(22) Filed: Mar. 20, 2015

(65) Prior Publication Data
US 2015/0195455 A1    Jul. 9, 2015

Related U.S. Application Data

(63) Continuation of application No. 13/361,751, filed on Jan. 30, 2012, now Pat. No. 9,013,598.

(30) Foreign Application Priority Data
Feb. 2, 2011    (JP) .................. 2011-021190

(51) Int. Cl.
| | |
|---|---|
| H04N 5/76 | (2006.01) |
| H04N 5/232 | (2006.01) |
| G06F 17/30 | (2006.01) |
| H04N 1/21 | (2006.01) |
| H04N 1/32 | (2006.01) |
| H04N 5/77 | (2006.01) |
| H04N 5/907 | (2006.01) |
| H04N 9/804 | (2006.01) |
| H04N 9/82 | (2006.01) |
| H04N 5/225 | (2006.01) |

(52) U.S. Cl.
CPC ...... *H04N 5/23245* (2013.01); *G06F 17/3028* (2013.01); *H04N 1/212* (2013.01); *H04N 1/32101* (2013.01); *H04N 5/772* (2013.01); *H04N 5/907* (2013.01); *H04N 9/8042* (2013.01); *H04N 9/8227* (2013.01); *H04N 2201/3267* (2013.01); *H04N 2201/3277* (2013.01)

(58) Field of Classification Search
CPC .... H04N 1/212; H04N 1/32101; H04N 5/772; H04N 5/907; H04N 9/8042; H04N 9/8227; G06F 17/3028
USPC ........ 348/231.99, 231.2, 231.3, 231.5, 231.6
See application file for complete search history.

(56) References Cited

U.S. PATENT DOCUMENTS

| | | | |
|---|---|---|---|
| 2002/0140826 A1* | 10/2002 | Sato | H04N 1/2112 348/222.1 |
| 2005/0081138 A1* | 4/2005 | Voss | G06F 17/30817 715/200 |
| 2006/0143235 A1* | 6/2006 | Takaku | G11B 27/034 |
| 2008/0049349 A1* | 2/2008 | Nakase | H04N 1/00204 360/48 |
| 2009/0097828 A1* | 4/2009 | Ishii | G11B 27/034 386/326 |

(Continued)

FOREIGN PATENT DOCUMENTS
JP    2010-136191 A    6/2010

*Primary Examiner* — Kelly L Jerabek
(74) *Attorney, Agent, or Firm* — Canon USA, Inc. I.P. Division

(57) ABSTRACT

A moving image data recording apparatus and method that records a moving image file and a still image file and associates them with each other in the same directory.

13 Claims, 6 Drawing Sheets

(56) References Cited

U.S. PATENT DOCUMENTS

| | | | |
|---|---|---|---|
| 2009/0115861 A1* | 5/2009 | Mochizuki | H04N 5/77 348/220.1 |
| 2009/0225178 A1* | 9/2009 | Nakase | G06F 17/30265 348/220.1 |
| 2010/0020188 A1* | 1/2010 | Yamaguchi | G11B 27/034 348/220.1 |
| 2010/0188527 A1* | 7/2010 | Onoda | G11B 27/32 348/231.2 |
| 2011/0019010 A1* | 1/2011 | Satou | H04N 5/907 348/207.1 |
| 2011/0025865 A1* | 2/2011 | Kunishige | H04N 5/232 348/220.1 |

* cited by examiner

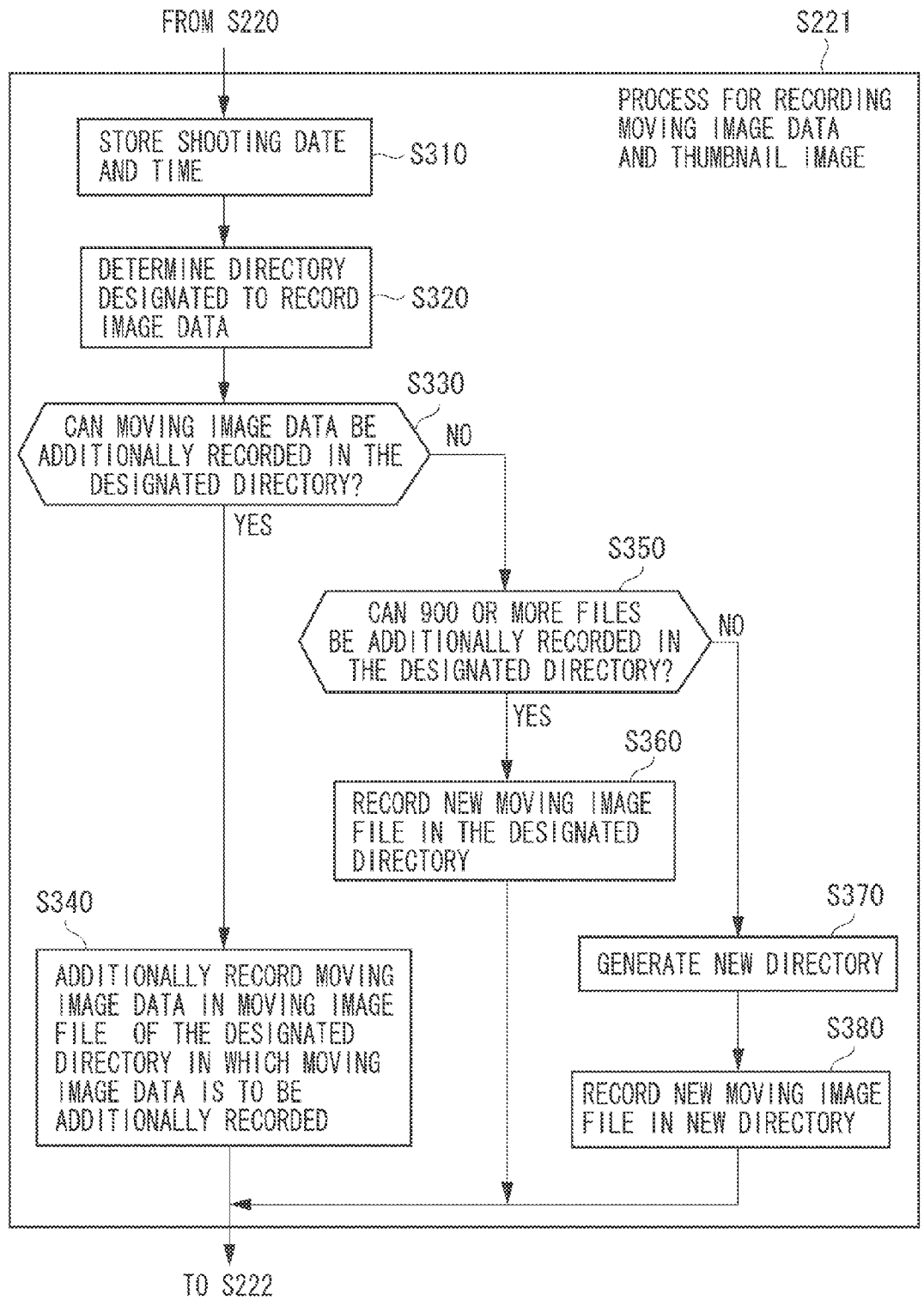

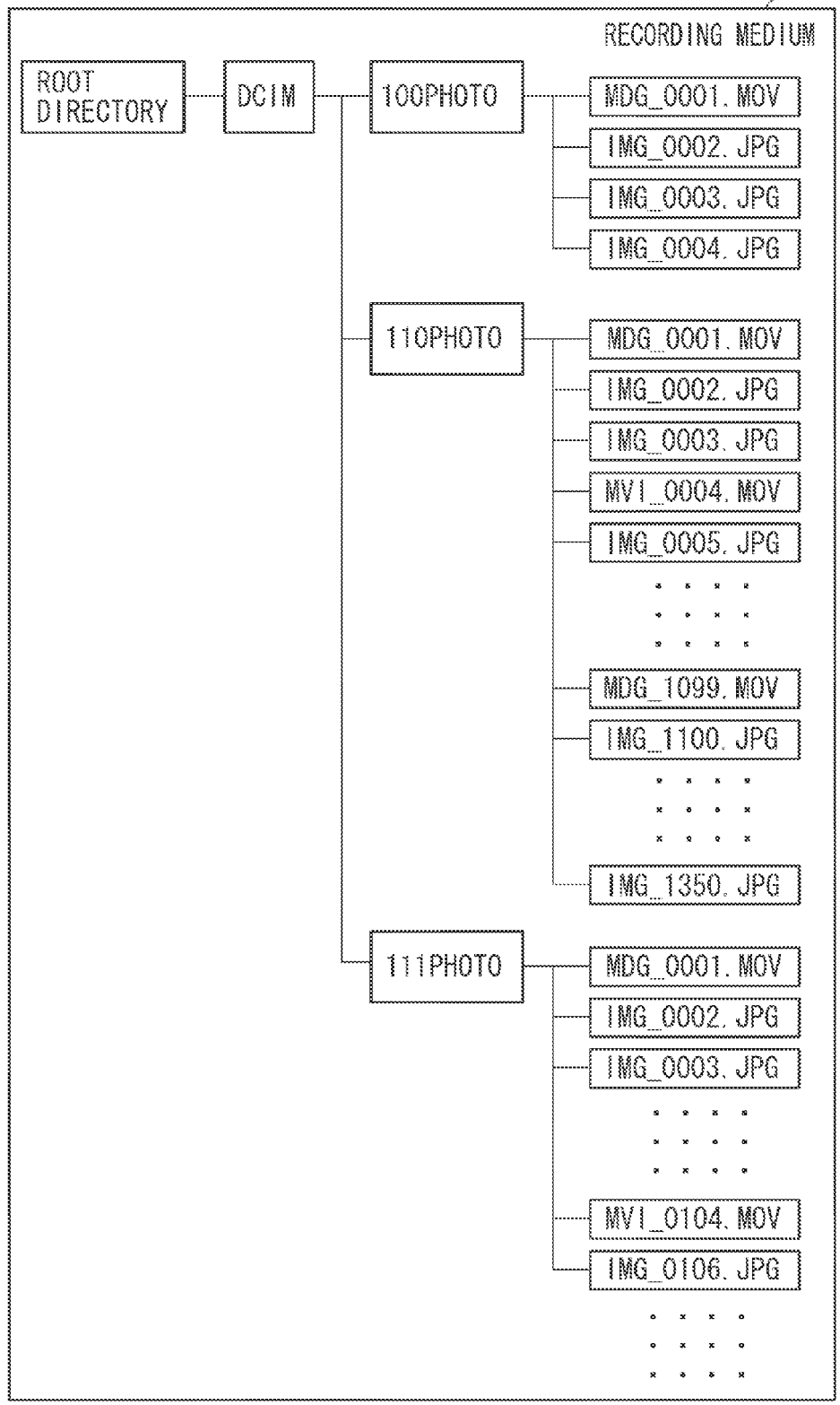

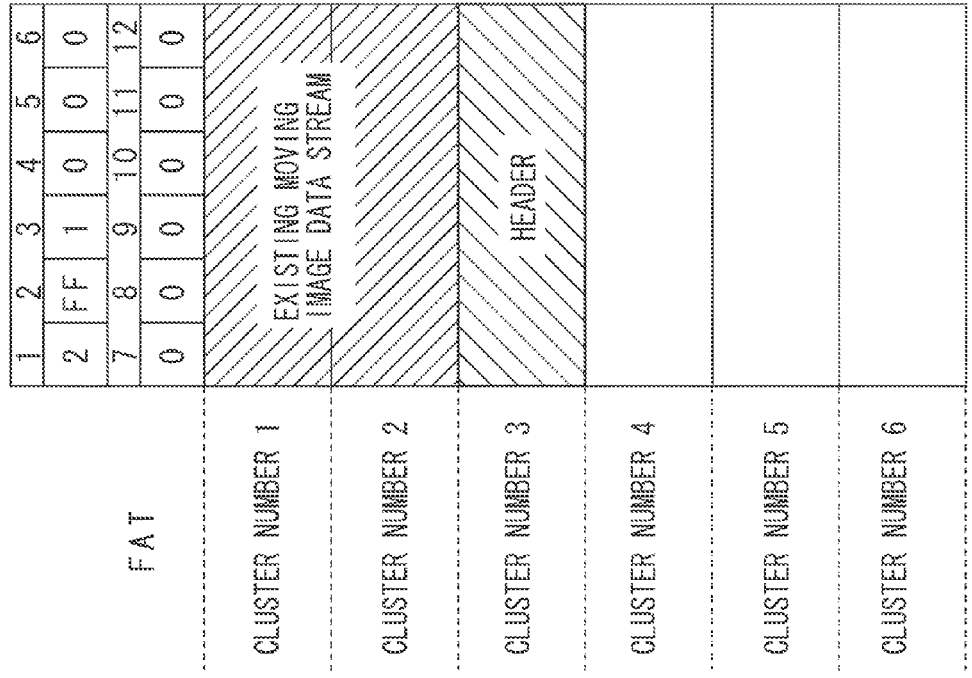

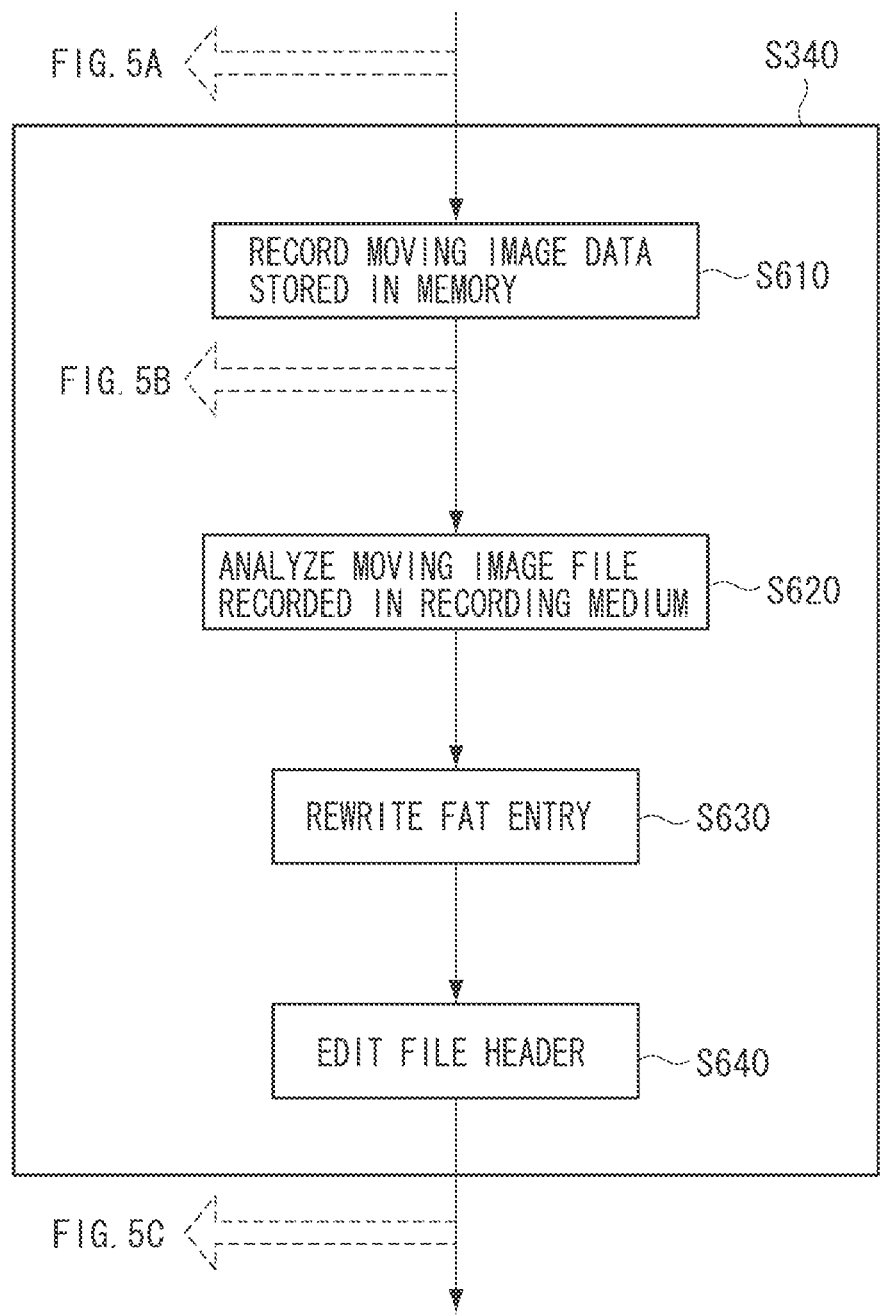

IMAGE DATA RECORDING APPARATUS CAPABLE OF RECORDING STILL AND MOVING IMAGES SIMULTANEOUSLY

CROSS REFERENCE OF RELATED APPLICATIONS

This application is a continuation of U.S. application Ser. No. 13/361,751 filed Jan. 30, 2012 which claims priority from Japanese Patent Application No. 2011-021190 filed Feb. 2, 2011, each of which is hereby incorporated by reference herein in its entirety.

BACKGROUND OF THE INVENTION

Field of the Invention

The present invention relates to an image data recording apparatus.

Description of the Related Art

Conventionally, an imaging apparatus, i.e., a moving image data recording apparatus, includes a function for generating moving image data from captured images, and recording the moving image data in a recording medium such as a memory card. Further, there has been proposed an imaging apparatus as discussed in Japanese Patent Application Laid-Open No. 2002-300445, which starts capturing a moving image by a user half pushing a shutter, ends capturing the moving image by the user fully-pressing the shutter, and then captures a still image. The imaging apparatus records the acquired moving image file and the still image file associated with each other.

Furthermore, Japanese Patent Application Laid-Open No. 2002-218384 discusses an imaging apparatus capable of additionally recording newly captured moving image data to moving image data stored in an existing moving image file recorded in the recording medium. Moreover, a file system such as a file allocation table (FAT) file system which is generally used in a computer or an imaging apparatus records a file creation date. According to such a standard, information on creation date and time of a file included in a specific directory can also be easily read out.

However, the imaging apparatus discussed in Japanese Patent Application Laid-Open No. 2002-300445 generates each of the captured still image file, the captured moving image file, and an association file in separate directories (refer to FIG. 3 in Japanese Patent Application Laid-Open No. 2002-300445). The association file is a file which associates the captured still image file and moving image file with each other. As a result, if a different computer is to confirm the relationship between the still image file and the moving file by reading the recording medium in which the image files captured by the imaging apparatus are recorded, it becomes necessary to install in the computer, software capable of reading the association file.

Further, according to the design rule for camera file system (DCF) standard used in a digital camera, less than 9999 files can be stored in one directory. The still image file and the moving image file may thus be stored in different directories, even if the still image and the moving image are captured on the same day.

Furthermore, the computer using a general file system can easily display the files recorded in a specific directory in an order according to a shooting date. However, it is not easy for such a computer to display the files recorded in different directories in the order according to the shooting date.

SUMMARY OF THE INVENTION

Embodiments of the present invention are directed to providing a moving image data recording apparatus which records the moving image file and the still image file which are associated with each other in the same directory, so that the user can easily confirm and operate the files.

According to an aspect of the present invention, an image data recording apparatus includes a moving image acquisition unit configured to acquire moving image data, a still image acquisition unit configured to acquire still image data, a recording unit configured to record in a designated directory in a recording medium, the moving image data and the still image data respectively, and a control unit configured to control the moving image acquisition unit, the still image acquisition unit, and the recording unit, wherein the control unit is configured to control, in response to input of an image capturing instruction, the image acquisition unit to acquire moving image data, and still image data, to determine whether a moving image file to which the moving image data can be additively recorded is included in a specific directory in the recording medium, and to control, if a moving image file to which the moving image data can be additively recorded is included, the recording unit to additively record the moving image data in the moving image file, and store in the specific directory the still image data as a still image file.

According to the present invention, the still image data and the moving image data are acquired according to one image capturing instruction, and the moving image data is additionally recorded in the moving image file to be additionally recorded. In such a configuration, the moving image file including the moving image data and the still image file including the still image data corresponding to the specific image capturing instruction can be stored in the same directory. As a result, if the user reads by a general computer the recording medium on which the data has been recorded by the imaging apparatus according to the present exemplary embodiment, the user can easily confirm and operate the files.

The invention extends to methods, apparatus and/or use substantially as herein described with reference to the accompanying drawings. Any feature in one aspect of the invention may be applied to other aspects of the invention, in any appropriate combination. In particular, features of method aspects may be applied to apparatus aspects, and vice versa. Furthermore, features implemented in hardware may generally be implemented in software, and vice versa. Any reference to software and hardware features herein should be construed accordingly. Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating recording of the still image file and the moving image file in the movie digest mode.

FIG. 4 illustrates a storing state of the image files.

FIGS. 5A, 5B, and 5C illustrate changes in the states of the moving image file due to connecting (i.e., additionally recording) the moving image data.

FIG. 6 is a flowchart illustrating control performed for connecting (i.e., additionally recording) the moving image data.

DESCRIPTION OF THE EMBODIMENTS

Figure 1:
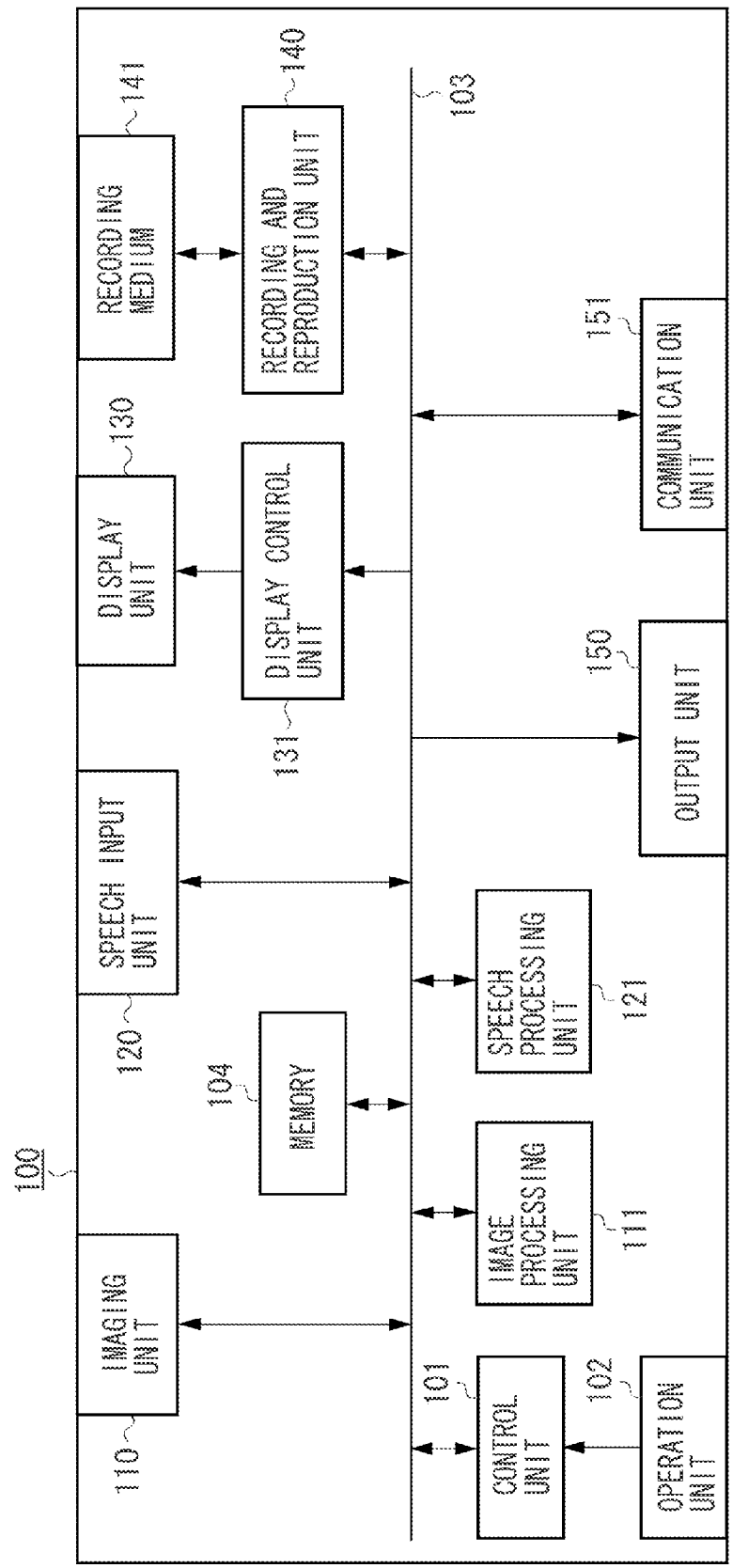
FIG. 1 illustrates a configuration of an imaging apparatus according to a first exemplary embodiment.

Various exemplary embodiments, features, and aspects of the invention will be described in detail below with reference to the drawings.

According to the first exemplary embodiment, the image apparatus will be described below as an apparatus capable of recording images. The imaging apparatus according to the present exemplary embodiment can record in a normal "moving image shooting mode", one moving image, from a start to an end, as one file in the recording medium. Further, in a normal "still image shooting mode", the imaging apparatus can record the still image data captured according to one image capturing instruction.

Furthermore, according to the present exemplary embodiment, the imaging apparatus includes a "movie digest mode". In such a mode, the imaging apparatus records on the recording medium not only the still image data captured according to the still image capturing instruction. The imaging apparatus also acquires the moving image data (i.e., performs moving image acquisition) of a predetermined length of time which has been captured up to when the user has input the still image capturing instruction. The imaging apparatus then records the acquired moving image data in the recording medium as a moving image file. The imaging apparatus temporarily stores the moving image data in a memory therein and can subsequently transfer data from the memory to the recording medium.

In the movie digest mode, the imaging apparatus can generate one moving image file in which all of the moving image data captured on the same day are connected, and record the moving image file in the recording medium. In such a case, the imaging apparatus connects (i.e., additively records or appends) newly captured moving image data to previously recorded moving image data in the moving image file in the recording medium, each time the user inputs the still image capturing instruction. The imaging apparatus can thus reproduce the moving image based on the sequentially connected moving image data. According to the present exemplary embodiment, the "movie digest mode" may be referred to as a first shooting mode, the "moving image shooting mode" as a second shooting mode, and the "still image shooting mode" as a third shooting mode.

In particular, when the imaging apparatus according to the present exemplary embodiment shifts to the movie digest mode, the imaging apparatus generates and sequentially stores in the memory coded moving image data. More specifically, each of a plurality of images acquired by an imaging unit is a frame image of the moving image in the coded moving image data. Further, the imaging apparatus discards or overwrites in the memory the moving image data which has been acquired before a predetermined length of time or longer in the past. If the user then inputs an image capturing instruction, the imaging apparatus generates the still image data based on image signals acquired by the imaging unit, and records the still image data in the recording medium. The imaging apparatus acquires at that time the moving image data (i.e., performs moving image acquisition) of a predetermined length of time which has been stored in the memory, and records the acquired moving image data in the recording medium as the moving image file.

The imaging apparatus may connect the moving image data of the predetermined length of time to the moving image data in the moving image file previously recorded in the recording medium (i.e., existing moving image file). In such a case, the imaging apparatus first records in the recording medium the moving image data of the predetermined length of time temporarily stored in the memory. The imaging apparatus then analyzes the moving image data in the existing moving image file, identifies a connecting position, and performs editing to connect the moving image data. The imaging apparatus performs such a process by rewriting a FAT entry of a FAT area in the FAT file system to change a cluster chain, and editing a header file of the moving image file.

By performing such a connecting process, the imaging apparatus additively records the moving image data in the moving image file, so that imaging apparatus can continuously reproduce the moving image of the moving image data acquired by current shooting, subsequent to the moving image in the existing moving image file. The imaging apparatus records the moving image file to which the moving image data is additionally recorded in the recording medium. As a result of performing the above-described image recording, a moving image data storage area in the memory becomes available before the imaging apparatus completes analyzing the existing moving image file. According to the present exemplary embodiment, the time necessary for the imaging apparatus to start the next moving image capturing is thus prevented from becoming long.

Further, according to the present exemplary embodiment, the recording medium is formatted according to a general file system such as FAT and extended (ex) FAT. The imaging apparatus in the movie digest mode records in the recording medium the moving image file including the moving image data, and the still image file in the still image data, acquired according to one image capturing instruction. In such a case, the imaging apparatus can record the moving image file and the still image file to be included in the same directory.

To realize the above, according to the present exemplary embodiment, the imaging apparatus performs the following process in the movie digest mode. If a recording instruction is received, the imaging apparatus determines whether the directory designated to record the image file includes a moving image file captured in the movie digest mode on the same date and recorded in the recording medium. If the directory designated to record the image file includes a moving image file recorded on the same date, it indicates that the directory designated to record the image file includes such a moving image file to which the moving image data is to be additively recorded. The imaging apparatus thus additively records in the moving image file the moving image data acquired according to the image capturing instruction. The imaging apparatus then records in the directory designated to record the image file, the still image file of the still image data acquired according to the image capturing instruction.

On the other hand, if the directory designated to record the image file does not include a moving image file recorded on the same date, the imaging apparatus detects the number of further files that can be recorded in the directory designated to record the file. The imaging apparatus then determines whether the detected number of files is greater than a predetermined number. If the detected number of files is smaller than a predetermined number (ie if there is more than a predetermined amount of file space remaining), the imaging apparatus generates a new directory. The imaging apparatus then stores in the new directory the moving image file of the acquired moving image data and the still image file of the acquired still image data. If the detected number of files is greater than a predetermined number, the imaging apparatus stores in the directory designated to record the files, the moving image file of the acquired moving image data and the still image file of the acquired still image data. If the imaging apparatus further performs image capturing on the same day, the imaging apparatus records the stored moving image file as the moving image file to which the moving image data is to be additively recorded.

The imaging apparatus according to the present exemplary embodiment will be described below. FIG. 1 illustrates a configuration of an imaging apparatus 100 according to the present exemplary embodiment.

Referring to FIG. 1, a control unit 101 includes a central processing unit (CPU) or a microprocessor unit (MPU), and a memory (e.g., a dynamic random access memory (RAM) or a static (S) RAM). The control unit 101 performs various processes (i.e., programs) according to an operation signal input from an operation unit 102 which receives a user operation, and controls each block in the imaging apparatus 100 and data transmission between each of the blocks. The control unit 101 may be a microcomputer including the CPU and the memory.

The operation unit 102 includes switches for the user to input various operations for performing image capturing, such as a power button, a recording start button, a zoom adjustment button, an auto-focus button. Further, the operation unit 102 includes a menu display button, an enter button, a cursor key, a pointing device, and a touch panel. If the user operates such keys and buttons, the operation unit 102 transmits the operation signal to the control unit 101.

A bus 103 is a common bus for transmitting to each block in the imaging apparatus 100 various data, control signals, and instruction signals.

An imaging unit 110 controls using a diaphragm, light amount of an optical image of an object captured by a lens, and converts the optical image to the image signal using an image sensor such as a charge-coupled device (CCD) sensor or a complementary metal oxide semiconductor (CMOS) sensor. The imaging unit 110 then performs an analog-digital conversion on the image signal, and transmits to and temporarily stores in a memory 104 the converted signal.

An image processing unit 111 which performs the processes necessary for recording and reproducing the image is a microcomputer in which programs for executing the processes to be described below are installed. The image processing unit 111 may also perform as a function of the control unit 101 the processes to be described below. The image processing unit 111 performs image quality adjustment on the digital image signal acquired by the imaging unit 110 and stored in the memory 104. More specifically, the image processing unit 111 adjusts white balance, color, and brightness based on setting values set by the user or determined from image characteristics.

Further, the image processing unit 111 generates the moving image data from the image signals of a plurality of frames on which image quality adjustment has been performed. According to the present exemplary embodiment, the image processing unit 111 may perform intraframe-coding on each frame in the moving image data and generate compression-coded moving image data. Further, the image processing unit 111 may generate compression-coded moving image data using a difference between a plurality of frames of the moving image data, or motion prediction.

The image processing unit 111 can generate the moving image data of various known compression coding methods, such as motion joint photographic experts group (JPEG), moving picture experts group (MPEG), and H. 264 (MPEG4—Part 10 advanced video coding (AVC)). In general, the moving image data on which intraframe-coding has been performed is referred to an I picture. The moving image data on which intraframe-coding has been performed using a difference from a previous frame is referred to as a P picture. The moving image data on which intraframe-coding has been performed using a difference between previous and subsequent frames is referred to as a B picture. Since such compression methods employ known methods and are not related to the feature of the present invention, description will be omitted.

Furthermore, the image processing unit 111 can generate the still image data from the image signal on which image quality adjustment has been performed. In such a case, the image processing unit 111 employs a general compression coding method such as JPEG, which is a known method and is not related to the feature of the present invention, so that description will be omitted. The still image data may also be RAW image data in which the digital image signal acquired by the imaging unit 110 is directly recorded.

The moving image data and the still image data generated by the image processing unit 111 are stored in an area other than the area in which the above-described digital image signal acquired by the imaging unit is stored in the memory 104. According to the present exemplary embodiment, the digital image signal acquired by the imaging unit 110 and the moving image data and the still image data generated by the image processing unit 111 are stored in the same memory 104. However, it is not limited that the acquired digital image signal and the generated moving image data and still image data are stored in same memory, so the acquired digital image signal and the generated moving image data and still image data may be stored in different memories.

A speech input unit 120 collects speech surrounding the imaging apparatus 100 using an internal non-directional microphone or an external microphone connected via a speech input terminal. The speech input unit 120 then converts the acquired analog speech signal to a digital signal, and transmits to and temporarily stores in the memory 104 the digital signal.

A speech processing unit 121 which performs the processes necessary for recording and reproducing the speech is a microcomputer in which programs for executing the processes to be described below are installed. Further, the speech processing unit 121 as a function of the control unit 101 may perform the processes to be described below. The speech processing unit 121 adjusts a level of or performs noise reduction on the digital signal acquired by the speech input unit 120 and stored in the memory 104. Furthermore, the speech processing unit 121 compresses the speech signal as necessary. The speech processing unit 121 uses generally-known speech compression methods such as audio code number 3 (AC3) and advanced audio coding (AAC), which are not related to the feature of the present invention, so that description will be omitted. The speech data generated by the speech processing unit 121 is again stored in the memory 104.

A display control unit 131 is a microcomputer that performs display control for displaying the image on a display unit 130. The display control unit 131 reads out the digital image signal temporarily stored in the memory 104 and displays the image on the display unit 130. The display unit 130 may be a liquid crystal panel or an organic light emitting (EL) panel included in the imaging apparatus 100, or a display device separate from the imaging apparatus 100 (e.g., television, monitor, or projector).

The control unit 101 reads out from and transfers to a recording and reproduction unit 140 the moving image data and the speech data stored in the memory 104. The recording and reproduction unit 140 then records the transferred moving image data and speech data in a recording medium 141 as one moving image file. The control unit 101 may also generate and record on the recording medium 141 along with the moving image data and the speech data, various data indicating a camera setting for performing image capturing, and detected data. The recording medium 141 may be embedded in the imaging apparatus or may be detachable. The recording medium of various methods may be used, such as a hard disk, an optical disk, an opto-magnetic disk, a compact disk (CD)-readable (R), a digital versatile disk (DVD)-R, a magnetic tape, a non-volatile semiconductor memory, and a flash memory.

Further, when recording the still image file, the control unit 101 reads out and transfers to the recording and reproduction unit 140 the still image data stored in the memory 104. The recording and reproduction unit 140 thus records the transferred still image data in the recording medium 141.

Furthermore, the recording and reproduction unit 140 reads out (i.e., reproduces) the moving image file recorded in the recording medium 141, and reads header information of the moving image included in the read moving image file. The control unit 101 then controls the recording and reproduction unit 140 to read out from the recording medium 141 the moving image data and the speech data to be reproduced, based on the read header information. The recording and reproduction unit 140 transfers the read moving image data to the image processing unit 111 and the reproduced speech data to the speech processing unit 121.

The image processing unit 111 sequentially stores in the memory 104 one frame of the reproduced moving image data. The display control unit 131 then sequentially reads out and displays on the display unit 130 the image of one frame stored in the memory 104. On the other hand, the speech processing unit 121 decodes the digital speech signal from the reproduced speech data, converts the digital speech signal to an analog signal, and outputs the analog speech signal to a speech output unit (e.g., a speaker, an earphone terminal, or a speech output terminal, not illustrated).

When reproducing the still image, the recording and reproduction unit 140 reads out (reproduces) the still image file recorded in the recording medium 141. The control unit 101 then transmits to the image processing unit 111 the still image data included in the read still image file, and the image processing unit 111 stores the image of the still image data in the memory 104. The display control unit 131 sequentially reads and displays on the display unit 130 one frame of the image stored in the memory 104.

An output unit 150 is a speech terminal or a video terminal which outputs the image signal or the speech signal to the external device. A communication unit 151 transmits and receives data to and from the external device, and can be connected to the external device via wired or wireless connection.

According to the present exemplary embodiment, the imaging apparatus 100 records the moving image file using QuickTime (registered trademark) format as an example. However, any format may be used.

Further, according to the present exemplary embodiment, the FAT file system generally used in an embedded device is employed as a file management system of the recording medium 141. Since techniques used in the FAT file system is well-known, the techniques will only be described with respect to the characteristic operations of the present exemplary embodiment. Furthermore, an NT file system (FS) format and the exFAT format which are FAT file formats may also be used.

The microcomputer in the imaging apparatus 100 manages a physical memory area in the recording medium 141 such as the flash memory. If the recording and reproduction unit 140 in the imaging apparatus 100 accesses the recording medium 141, the microcomputer manages the recording medium 141 so that the recording medium 141 is seen as logically storing the data using the FAT file system.

According to the present exemplary embodiment, the imaging apparatus 100 includes as described above, the "movie digest mode (i.e., the first shooting mode)", the "moving image shooting mode (i.e., the second shooting mode)", and the "still image shooting mode (i.e., the third shooting mode)".

A normal operation of the imaging apparatus 100 according to the present exemplary embodiment will be described below.

According to the present exemplary embodiment, when the user operates the power button on the operation unit 102 in the imaging apparatus 100, the operation unit 102 instructs the control unit 101 to activate. The control unit 101 receiving the instruction controls a power supplying unit (not illustrated) to supply power to each block in the imaging apparatus 100.

After the power supplying unit supplies the power, the control unit 101 confirms whether the user has set a mode switch in the operation unit 102 to the "still image shooting mode", the "moving image shooting mode", a "playback mode", or the "movie digest mode", based on the instruction signal received from the operation unit 102.

In the "still image shooting mode", the imaging apparatus 100 which is in a shooting standby state performs image capturing when the user operates a still image recording button in the operation unit 102, and records the still image file in the recording medium 141. The imaging apparatus 100 then returns to the shooting standby state.

In the "moving image shooting mode", the imaging apparatus 100 which is in the shooting standby state starts image capturing when the user operates a moving image recording start button in the operation unit 102. While performing imaging capturing, the imaging apparatus 100 records the moving image data and the speech data in the recording medium 141. When the user operates a moving image recording end button in the operation unit 102, the imaging apparatus 100 ends image capturing and generates the moving image data and the speech data recorded in the recording medium 141 into a moving image file. The imaging apparatus 100 then returns to the shooting standby state.

In the "playback mode", the imaging apparatus 100 reproduces from the recording medium 141 the still image file and the moving image file related to the file selected by the user, and outputs the still image, the moving image, and speech.

The "still image shooting mode" will be described in detail below. When the user sets the "still image shooting mode" by operating the operation unit 102, the control unit 101 sets each block in the imaging apparatus 100 to the shooting standby state.

In the shooting standby state, the display control unit 131 reads out the digital image signal temporarily stored in the memory 104, and causes the display unit 130 to display the moving image based on the image signal. The user thus prepares for shooting while viewing a displayed screen.

The user then operates the still image recording button in the operation unit 102 in the shooting standby state, so that the image capturing instruction is transmitted. The control unit 101 transmits an image capturing control signal to each block in the imaging apparatus 100, and performs control for executing the operations to be described below.

The imaging unit 110 uses the image sensor to convert the object optical image captured by the lens to the image signal, performs analog-digital conversion on the image signal, and temporarily stores the converted digital signal in the memory 104. The image processing unit 111 performs the image quality adjustment (e.g., white balance, color, and brightness adjustment) on the digital image signal stored in the memory 104, based on the setting values. The display control unit 131 reads and displays on the display unit 130 the digital image signal processed by the image processing unit 111. The user views the image displayed on the display unit 130, and can thus confirm the captured still image.

The image processing unit 111 then reads out the image signal temporarily stored in the memory 104 and performs predetermined coding, generates the still image data (i.e., performs still image acquisition), and outputs the still image data to the recording and reproduction unit 140. The recording and reproduction unit 140 writes in the recording medium 141 the still image data as the still image file, under management of a file system such as a universal disk format (UDF) or the FAT file system. When the image processing unit 11 ends the coding operation, the control unit 101 transmits to each block in the imaging apparatus 100 the control signal for shifting to the shooting standby state, and the imaging apparatus 100 returns to the shooting standby state.

The "moving image shooting mode" will be described in detail below. When the user sets the "moving image shooting mode" by operating the operation unit 102, the control unit 101 sets each block in the imaging apparatus 100 to the shooting standby state.

The display control unit 131 in the shooting standby state then reads outs the digital image signal sequentially stored in the memory 104, and displays on the display unit 130 the moving image based on the image signal. The user thus prepares for shooting while viewing the displayed screen.

The user operates the moving image recording start button in the operation unit 102 in the shooting standby state, so that the image capturing instruction is transmitted. The control unit 101 then transmits the image capturing control signal to each block in the imaging apparatus 100 and performs control for executing the operations to be described below.

The imaging unit 110 uses the image sensor to convert the object optical image captured by the lens to the image signal, performs analog-digital conversion of the image signal, and sequentially stores the converted digital signal in the memory 104. The image processing unit 111 performs image quality adjustment (e.g., white balance, color, and brightness adjustment) on the digital image signal temporarily stored in the memory 104, based on the setting values. The display control unit 131 reads and displays on the display unit 130 the digital image signal processed by the image processing unit 111.

On the other hand, the speech input unit 120 performs digital conversion on an analog speech signal acquired via the microphone, and stores the acquired digital speech signal in the memory 104. The speech processing unit 121 processes the digital speech signal stored in the memory 104 to an appropriate volume level, and outputs the speech signal. The speech processing unit 121 may also perform compression of the speech signal.

The image processing unit 111 and the speech processing unit 121 then respectively read and perform predetermined coding on the image signal and the speech signal temporarily stored in the memory 104, and generate the moving image data and the speech data. The control unit 101 combines the generated moving image data and speech data and forms a data stream, and outputs the generated data stream to the recording and reproduction unit 140. The recording and reproduction unit 140 writes in the recording medium 141 the data stream as one moving image file, under management of the file system such as UDF or FAT file system.

If the speech signal is not to be compressed, the control unit 101 outputs to the recording and reproduction unit 140 the speech signal generated by the speech processing unit 121 along with the moving image data generated by the image processing unit 111. The recording and reproduction unit 140 then writes in the recording medium 141 the data stream as one moving image file, under management of the file system such as UDF or FAT file system. The above-described operation is continued while the imaging apparatus 100 is capturing the moving image.

Further, while the imaging apparatus 100 is capturing the moving image, the control unit 101 transmits various control signals to the imaging unit 110, the image processing unit 111, and the speech processing unit 121. The control unit 101 transmits the control signals according to the operation by the user on the operation unit 102, or a result of analyzing the image signal generated by the image processing unit 111. For example, the control unit 101 transmits to the imaging unit 110 the control signal for moving the lens or adjusting the diaphragm. The control unit 101 also transmits the control signals to the image processing unit 111 and the speech processing unit 121 for adjusting the image or the speech.

Furthermore, if the user operates a zoom key in the operation unit 102 while the imaging apparatus 100 is capturing the moving image, the control unit 101 can cause the imaging unit 110 to perform an optical zoom function of or the image processing unit 111 to perform an electronic zoom function. Moreover, the control unit 101 causes the imaging unit 110 to perform an optical image stabilization function or the image processing unit 111 to perform an electronic image stabilization function, based on an acceleration signal detected by a vibration detection unit (not illustrated).

When the user operates a moving image recording end button in the operation unit 102, the instruction signal for ending image capturing is transmitted to the control unit 101. The control unit 101 then transmits the control signal for ending image capturing to each block in the imaging apparatus 100, and controls the blocks to perform the processes to be described below.

The image processing unit 111 and the speech processing unit 121 respectively read out and perform predetermined coding on the remaining image signal and the speech signal stored in the memory 104, and generate the moving image data and the speech data.

The control unit 101 generates the data stream using the moving image data and the speech data acquired by coding the remaining image signal and speech signal, and outputs the data stream to the recording and reproduction unit 140. If the speech signal is not to be compressed, the control unit 101 outputs to the recording and reproduction unit 140 the speech signal generated by the speech processing unit 121 and the moving image data.

The recording and reproduction unit 140 then writes in the recording medium 141 the data stream as one moving image file, under management of the file system such as FAT and exFAT. When supplying of the data stream has ended, the control unit 101 performs the operation to be described below to generate thumbnails.

The recording and reproduction unit 140 reads the moving image data in atop frame of the moving image file recorded in the recording medium 141, and transmits the read moving image data to the image processing unit 111. The image processing unit 111 temporarily stores the moving image data in the memory 104, and decodes the moving image data based on predetermined procedures. The image processing unit 111 then performs predetermined coding on the acquired image signal to generate the thumbnail, and thus generates a compressed image signal for displaying the thumbnail.

The control unit 101 outputs to the recording and reproduction unit 140 the compressed image signal for displaying the thumbnail. The recording and reproduction unit 140 writes in the recording medium 141, the compressed image to be used as the thumbnail, to be connected to the original moving image file, under management of the file system such as FAT and exFAT. The recording and reproduction unit 140 thus completes generation of the moving image file and ends the recording operation.

Upon ending of the recording operation, the control unit 101 transmits to each block in the imaging apparatus 100 the control signal for shifting to the shooting standby state, and the imaging apparatus 100 returns to the shooting standby state.

The "playback mode" will be described in detail below. When the user sets the "playback mode" on the operation unit 102, the control unit 101 transmits the control signal for shifting to a playback state to each block in the imaging apparatus 100, and causes each block to perform the processes to be described below.

The recording and reproduction unit 140 reads out the still image file configured as the compressed image signal, or the moving image file configured as the compressed image signal and the compressed speech signal or the speech signal, recorded in the recording medium 141. The control unit 101 then transmits to the image processing unit 111 and the speech processing unit 121 respectively the read compressed image signal and the compressed speech signal. If the speech signal is not compressed, the control unit 101 transmits the speech signal to the speech output unit 151.

The image processing unit 111 and the speech processing unit 121 temporarily store the compressed image signal and the compressed speech signal in the memory 104, and respectively decode the signals using predetermined procedures. The control unit 101 then transmits the decoded speech signal to the speech output unit 151 and the decoded image signal to the display control unit 131. The display control unit 131 displays on the display unit 130 a video image based on the input image signal, and outputs from an embedded speaker, or a connected earphone or a speaker, the speech based on the input speech signal.

The "movie digest mode" will be described below with reference to the flowchart illustrated in FIG. 2. The process illustrated in the flowchart of FIG. 2 which starts when the user sets the imaging apparatus 100 to the movie digest mode is executed by the control unit 101 controlling each unit in the imaging apparatus 100.

According to the present exemplary embodiment, whether the imaging apparatus 100 is to additively record the moving image data sequentially is determined after the imaging apparatus 100 receives an instruction to record the still image and before the imaging apparatus 100 records the moving image data in the recording medium 141. More specifically, the control unit 101 reads out from the recording and reproduction unit 140 the last moving image file captured in the movie digest mode and confirms the information on the shooting date. If the read moving image file has been captured on that day, the imaging apparatus 100 additively records the moving image data. If the moving image file is captured on a different day, the imaging apparatus 100 does not additively record the moving image data.

A file name of the moving image captured in the movie digest mode includes, for example, an identifier "MDG" indicating that the moving image is captured in the movie digest mode, followed by a four-digit integer which is sequentially incremented. As a result, the control unit 101 can easily identify that the moving image recorded in the recording medium 141 whose file name includes the identifier "MDG" and the largest number is the moving image that has been last captured.

The condition for additionally recording the moving image data will be described below. The control unit 101 may confirm whether to additionally record the moving image data when the imaging apparatus 100 is activated, or when the user switches the mode to the movie digest mode. According to the present exemplary embodiment, the file name of the moving image file captured in the normal moving image capture mode includes "MVI", followed by a four-digit integer which is sequentially incremented. Further, the file name of the still image file includes "IMG", followed by a four-digit integer which is sequentially incremented, regardless of whether the still image file has been captured in the normal still image shooting mode or the movie digest mode.

Furthermore, according to the present exemplary embodiment, the imaging apparatus generates the thumbnail image every time the user inputs the still image capturing instruction. In such a case, the moving image file to which the moving image data is additively recorded is associated with a plurality of thumbnail images. However, there may be an imaging apparatus which generates the thumbnail image only when the moving image file is newly generated, instead of when the moving image data is additively recorded to the moving image file.

When the user sets the imaging apparatus 100 to the movie digest mode on the operation unit 102, the control unit 101 controls each block in the imaging apparatus 100 to cause each block to perform the processes to be described below.

In step S201, the imaging unit 110 transmits to and temporarily stores in the memory 104 the acquired digital image signal. The display control unit 131 then reads out and displays on the display unit 130 the digital image signal stored in the memory 104. Further, the image processing unit 111 sequentially reads out the digital image signals stored in the memory 104 and performs coding to generate the moving image data. Furthermore, the control unit 101 causes the speech processing unit 121 to apply various adjustments on the input digital speech signal and performs coding according to a preset coding method for speech. The control unit 101 stores the acquired coded speech signal in the memory 104.

In step S202, the image processing unit 111 and the speech processing unit 121 respectively store in the memory 104 the coded moving image data and speech data. Hereinafter, the description on the speech data will be omitted. However, it is assumed that the speech data is processed along with the moving image data.

According to the present exemplary embodiment, the imaging apparatus 100 deletes from the moving image data stored in the memory 104 which regularly stores the latest moving image data of a predetermined length of time, the moving image data captured before a predetermined time. In step S203, the control unit 101 thus determines whether the moving image data of a predetermined length of time or longer has been stored in the memory 104. If the control unit 101 determines that the moving image data of the predetermined length of time or longer has been stored in the memory 104 (YES in step S203), the process proceeds to step S204. In step S204, the control unit 101 discards the moving image data indicating the image captured before the predetermined time. Since the size of the data to be deleted is defined in coded units, the size of the data to be deleted may be determined as a frame or a playback time, depending on the coding method.

On the other hand, if the control unit 101 determines that the moving image data of the predetermined length of time or longer has not been stored in the memory 104 (NO in step S203), the moving image data is not discarded. According to the present exemplary embodiment, the predetermined length of time may be an arbitrary length of time. However, the user may be allowed to select the length of time, such as 4 seconds, 6 seconds, or 8 seconds.

In step S205, the control unit 101 determines whether the user has input the still image capturing instruction in the operation input unit 112. If the control unit 101 determines that the user has not input the still image capturing instruction (NO in step S205), the process returns to step S201, and the control unit 101 continues to generate and temporarily store the moving image data.

According to the present exemplary embodiment, the memory 104 regularly stores the latest moving image data of a predetermined length of time. However, the present invention is not limited to the above. In other words, the size of the moving image data stored in the memory 104 may be a predetermined amount of any quantifiable size defined by, for example, a number of frames, a number of group of pictures (GOP), or a data size. If the size of the moving image data stored in the memory 104 becomes greater than or equal to a predetermined size, the moving image data is sequentially deleted from the oldest captured frame among the frames in the moving image data. The frames are deleted until the size of the moving image data becomes smaller than the predetermined size.

If the control unit 101 determines that the user has input the still image capturing instruction (YES in step S205), the control unit 101 may control the recording and reproduction unit 140 to check a recordable capacity of the recording medium 141 and determine whether the moving image data temporarily stored in the memory 104 can be recorded. The control unit 101 may make a determination by comparing whether a sum of the size of the moving image data temporarily stored in the memory 104 and an expected size of the still image data to be recorded is smaller than the recordable capacity of the recording medium 141. The expected size of the still image data may be 4 MB, or may be changed according to a recording size and image quality. If the control unit 101 determines that the moving image data and the still image data cannot be recorded in the recording medium 141, the control unit 101 may perform control so that only the still image is captured and the moving image data is not recorded.

Further, if the control unit 101 determines that the user has input the still image capturing instruction in step S205, and the moving image data of less than 1 second or 2 seconds is stored in the memory 104, the control unit 101 may invalidate the still image capturing instruction. The user may set such length of time the moving image data is recorded.

If the control unit 101 determines that the user has input the still image capturing instruction (YES in step S205), the process proceeds to step S210. In step S210, the control unit 101 causes the imaging unit 110 to perform shooting to capture the still image. In step S211, the control unit 101 in parallel to performing the process of step S210, causes the image processing unit 111 to decode the image of the top frame in the moving image data stored in the memory 104, and generate the thumbnail image.

According to the present exemplary embodiment, the image processing unit 111 generates the thumbnail image of the recorded moving image data from the image of the top frame. However, this is not a limitation, and the image processing unit 111 may generate the thumbnail image from any frame among the frames in the recorded moving image data. More specifically, if the user inputs the still image capturing instruction, the image processing unit 111 may generate the thumbnail image from any of the frames in the moving image data stored in the memory 104. As a result, image processing unit 111 can generate the thumbnail image of the moving image data without reading out the moving image file from the recording medium after once recording the moving image data in the recording medium. Processing time thus becomes shortened. If the control unit 101 determines that the user has input the still image capturing instruction, the control unit 101 performs control not to receive further still image capturing instruction input by the user.

In step S212, the control unit 101 determines whether the image processing unit 111 has completed generating the thumbnail image. If the image processing unit 111 has completed generating the thumbnail image (YES in step S212), the process proceeds to step S220.

In step S220, the control unit 101 causes the image processing unit 111 to sequentially perform developing and coding to acquire the still image data from the digital image signal captured in step S210. In step S221, the control unit 101 in parallel to performing the process of step S220, records in the recording medium 141 the thumbnail image generated in step S211, by including the thumbnail image in the header information of the coded moving image data temporarily stored in the memory 104.

According to the present exemplary embodiment, if the moving image file which is previously recorded in the recording medium 141 is the moving image file captured in the movie digest mode on the same day, the imaging apparatus 100 connects (additively records) the moving image data to the file. The imaging apparatus 100 connects (additively records) the moving image data to the file only when there is a moving image of a specific condition. For example, if there is a moving image file having been captured in the movie digest mode on the same day, the imaging apparatus 100 connects the moving image data. The condition for not connecting the moving image data to the file or a connecting method will be described below. Further, the developing process of the still image (performed in step S220) includes de-mosaic processing, in which color information is complemented when the image is captured, by collecting from surrounding pixels and applying insufficient color information with respect to each pixel, to generate a full-color image. The developing process may also include gamma correction and white balance adjustment.

When completing the developing process, the control unit 101 stores the developed digital image data again in the memory 104, and causes the display control unit 131 to read and display on the display unit 130 the stored data. In general, such a display is a so-called "recording review" display in which the display unit 130 displays the captured image directly after a digital camera has captured the image. The display unit 130 does not display any image and displays a black image, between receiving the still image capturing instruction and completing the still image developing process. The display unit 130 may also indicate "processing in progress" to the user instead of non-displaying.

The control unit 101 then causes the image processing unit 111 to perform coding according to the preset coding method for recording the still image. In step S222, the control unit 101 determines whether the developing process and the coding process of the still image have ended. If the control unit 101 determines that the developing process and the coding process of the still image have ended (YES in step S222), the process proceeds to step S223. In step S223, the control unit 101 transmits the generated still image data to the recording and reproduction unit 140, to be stored in the recording medium 141.

In step S224, the control unit 224 determines whether the user has operated on the operation input unit 102 to instruct ending the movie digest mode. If the user has not instructed ending the movie digest mode (NO in step S224), the process returns to step S201. In step S201, the control unit 101 starts capturing and coding the moving image in parallel to recording the still image. In such a case, the control unit 101 causes the display control unit 131 to read out the digital image signal stored in the memory 104 and re-display a through image on the display unit 130.

As described above, according to the present exemplary embodiment, the imaging apparatus 100 records the moving image file and the still image file in the movie digest mode.

The process of recording the moving image data and the still image data acquired in the movie digest mode (i.e., process performed in step S221 illustrated in FIG. 2) will be described below with reference to FIGS. 3 and 4. According to the present exemplary embodiment, the imaging apparatus stores in the same directory the still image file of the still image data and the moving image file including the moving image data acquired in one image capturing instruction.

According to the exemplary embodiment, if the newly captured moving image data (i.e., new moving image data) is acquired on the same day as the moving image file (i.e., the existing moving image file), the imaging apparatus 100 connects the moving image data to the existing moving image file. (The date of acquiring the moving image data may be a date set in the camera when the image is captured).

Further, as described above, according to the present exemplary embodiment, the general FAT or exFAT file system is employed. Furthermore, the imaging apparatus generates the directory and the file according to the DCF standard which is an image file management standard generally used in the digital camera. The DCF standard allows a maximum of 900 directories, each directory being sequentially numbered, to be arranged in a digital camera images (DCIM) directory and below in the recording medium 141. Further, the DCF standard allows a maximum of 9999 DCF objects (including still image files and moving image files) to be stored in each directory.

According to the present exemplary embodiment, the still image file and the moving image file are stored in the directory corresponding to the month or day in which the image is captured. Such directories are generated to correspond to each shooting month or shooting date. Further, according to the present exemplary embodiment, the imaging apparatus is capable of generating a maximum of 2000 files in each directory. The number of files which can be generated is less than the maximum number of files defined within the directory by the DCF standard. Such a setting prevents management information (i.e., directory entry information) from becoming excessively large in the FAT file system. For example, if the directory entry information becomes large, time for searching an image becomes long. Further, the imaging apparatus stores in one directory a maximum of 2000 DCF objects among 9999 DCF objects in view of convenience for the user in performing file management.

The process performed when connecting (additively recording) the newly captured moving image data (i.e., the new moving image data) to the moving image in the moving image file previously recorded in the recording medium 141 will be described below.

Figure 2:
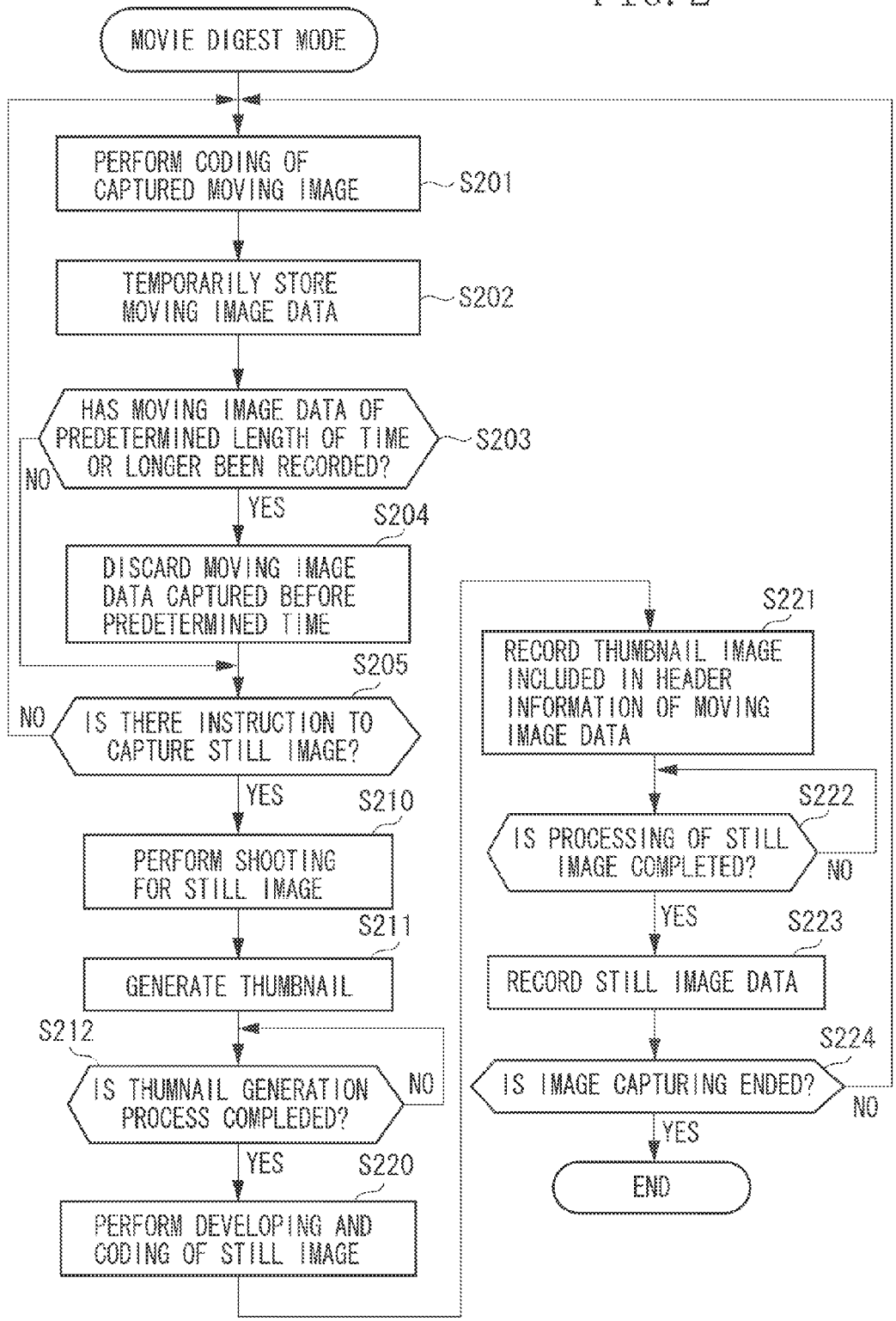
FIG. 2 is a flowchart illustrating control performed by the imaging apparatus in a movie digest mode.

FIG. 3 is a flowchart illustrating in detail the process performed in step S221 illustrated in FIG. 2 according to the present exemplary embodiment.

In step S220 illustrated in FIG. 2, the control unit 101 starts developing and compressing the still image. In step S310 illustrated in FIG. 3, the control unit 101 reads out the information about the date and time from a timer (not illustrated) in the imaging apparatus 100 at timing of receiving the image capturing instruction in step S205. The control unit 101 then stores in the memory 104 or a different memory (not illustrated) the read information as shooting date information.

The imaging apparatus adds the shooting date information to the still image file as the shooting date information of the still image data. Further, if the imaging apparatus is to newly generate the moving image file, the imaging apparatus adds the shooting date information to the moving image file as the shooting date information of the acquired moving image data. In this case, last date information of the acquired moving image data is added to the moving image data. For example, the imaging apparatus may capture the image of the top frame in the moving image file at 23:59:58 on Sep. 15, 2010, and the end frame at 00:00:02 on Sep. 16, 2010. In such a case, the shooting date information of the moving image data in the movie digest mode is 00:00:02, Sep. 16, 2010, which is when the imaging apparatus has captured the image of the end frame.

In step S320, the control unit 101 determines the directory designated to record the file in the recording medium 141. The control unit 101 makes the determination by analyzing the directory entry information in the recording medium 141 and identifying the directory which has last stored a file. The control unit 101 then determines whether the identified directory is appropriate for further recording the moving image file and the still image file.

For example, the control unit 101 may identify as the directory that has last stored a file, the directory whose name recorded in the recording medium 141 according to the DCF standard includes the largest number. Further, the control unit 101 may identify the directory using the directory entry information, based on a creation date or an updated date of the determined directory.

The control unit 101 then confirms the file that has been last recorded in the directory identified to have last stored a file. More specifically, the control unit 101 analyzes directory entry information of the directory which has last stored the file, and identifies the file whose file name includes the largest four-digit number. The control unit 101 may also identify the file which has been last recorded based on the creation date and the updated date. The file may be a still image file or a moving image file, as long as the file is referred to as a DCF object according to the DCF standard.

The control unit 101 then determines whether the directory is appropriate as the directory designated to record the file, based on the setting of the imaging apparatus 100. For example, if the imaging apparatus 100 is set to record the file in a new directory for each shooting date, the control unit 101 can determine whether the directory is appropriate by comparing the shooting date of the last recorded file with the shooting date information stored in step S310. If the shooting dates are the same, the control unit 101 determines that the directory is designated to record the file. If the shooting dates are different, the control unit 101 generates a new directory and sets the new directory as the directory designated to record the file. A similar process is performed in the case where the file is recorded in a new directory for each month in which the images are captured.

Further, if the directory is set to store less than 2000 files, the control unit 101 determines whether the file name of the last recorded file includes a number greater than or equal to "2000". If the number in the file name is less than "2000", the control unit 101 determines the directory as designated to record the file. If the number in the file name is greater than or equal to "2000", the control unit 101 generates a new directory and sets the new directory as designated to record the file.

As described above, in step S320, the control unit 101 determines the directory designated to record the file in the recording medium 141, based on the number of files stored in the directory, or the recording date information of the file recorded in the directory.

In step S330, since the imaging apparatus 100 is in the movie digest mode, the control unit 101 determines whether the moving image is to be added. According to the present exemplary embodiment, the moving image data is additively recorded as long as a moving image file recorded in the recording medium 141 is captured in the movie digest mode on the same day. The control unit 101 thus determines whether the directory determined in step S320 designated to record the file includes a moving image file captured in the movie digest mode on the same day.

As described above, according to the present exemplary embodiment, the moving image file captured in the movie digest mode employs the file name including "MDG" followed by a four-digit integer which is sequentially incremented. The control unit 101 thus identifies a moving image file of the file name including "MDG", in the directory determined in step S320 to record the file. The control unit 101 then refers to the shooting date information (or the creation date) of the moving image file and determines whether the date is the same as the shooting date stored in step S310. If the dates are the same, the control unit 101 determines that the moving image data can be additively recorded (YES in step S330), and the process proceeds to step S340. If the dates are different (i.e., a past date), the control unit 101 determines that the moving image data cannot be additively recorded (NO in step S330), and the process proceeds to step S350.

Other conditions by which the control unit 101 determines that the moving image data cannot be additively recorded will be described below. For example, if the moving image file to which the moving image data is to be additively recorded is protected, the control unit 101 determines that the moving image data cannot be additively recorded. Further, if the file size after additively recording the moving image data exceeds the upper limit of the file size of the file system, the control unit 101 determines that the moving image data cannot be additively recorded.

As described above, in step S330, the control unit 101 determines whether the moving image is to be additively recorded, according to the state of a moving image file captured in the "movie digest mode" to which the moving image is to be additively recorded.

Further, if the control unit 101 has generated a new directory in step S320, the directory which is to record the files does not contain any still image file or moving image file. In such a case, the control unit 101 determines that the moving image data cannot be additively recorded (NO in step S330).

If the control unit 101 determines that the moving image data can be additionally recorded (Yes in step S330), in step S340, the control unit 101 additively records the moving image data stored in the memory 104 in the moving image file to which the moving image data is to be additively recorded and is stored in the directory designated to record the file. The process of connecting (additively recording) the newly captured moving image data (i.e., new moving image data) to the moving image data in the moving image file previously recorded in the recording medium 141 will be described below with reference to FIGS. 5 and 6.

On the other hand, if the control unit 101 determines that the moving image data cannot be additionally recorded (NO in step S330), in step S350, the control unit 101 determines whether the directory determined in step S320 designated to record the files can record 900 or more files. According to the present exemplary embodiment, the number of files is set to 900 or more. However, the number may be 500 files or 100 files.

More specifically, according to the present exemplary embodiment, the imaging apparatus 100 in the movie digest mode newly generates the still image file as well as additively records the moving image data in the existing moving image file. If there are 1998 files in the directory designated to record the file so that only an additional 2 to 3 files can be stored, the moving image file to be additively recorded and the still image file to be newly recorded may not be stored in the same directory. The control unit 101 thus maintains a state in which 900 files that may be captured in one day can be stored in the directory. For example, it is not necessary to set a threshold value to 900 files or more. The imaging apparatus 100 may instead store a maximum number of still images and moving images captured in one day in the past, and set a number greater than the past maximum number (e.g., 1.5 times or twice the past maximum number) as the threshold value.

If the upper limit of the number of files in one directory is set to 2000 files, the control unit 101 identifies among the files stored in the directory designated to record the file, the file having the file name including the largest four-digit number. The control unit 101 then determines whether the identified file name includes a number greater than or equal to "1100" (2000-900). If the file name includes a number smaller than "1100" (YES in step S350), the process proceeds to step S360. If the file name includes a number larger than "1100" (NO in step S350), the process proceeds to step S370. If the control unit 101 has generated a new directory in step S320, 2000 files is storable in the new directory (YES in step S350).

In step S360, the control unit 101 controls the recording and reproduction unit 140 to record the moving image file of the moving image data in the directory designated to record the file identified in step S320 to be stored in the recording medium 141. The process then proceeds to step S222 illustrated in FIG. 2.

In step S370, the control unit 101 controls the recording and reproduction unit 140 to generate in the recording medium 141 a new directory different from the directory designated to record the file identified in step S320. The process proceeds to step S222.

In step S380, the control unit 101 controls the recording and reproduction unit 140 to record the moving image file of the moving image data in the newly generated directory to be stored in the recording medium 141. The process then proceeds to step S222.

In step S223 illustrated in FIG. 2, the control unit 101 controls the recording and reproduction unit 140 to store the still image file of the still image data in the directory including the moving image file of the moving image data acquired at the same time. In other words, if the control unit 101 performs the processes of step S340 or step S360 illustrated in FIG. 3, the control unit 101 controls in step S223 the recording and reproduction unit 140 to store the still image file in the directory designated to record the files identified in step S320. On the other hand, if the control unit 101 performs the process of step S380, the control unit 101 controls in step S223 the recording and reproduction unit 140 to store the still image file in the directory newly generated in step S370.

By performing the above-described process, the imaging apparatus according to the present exemplary embodiment can store in the same directory the moving image file including the moving image data and the still image file including the still image data, corresponding to a specific image capturing instruction. Further, the imaging apparatus can store a large number of files in the same directory as the directory storing the moving image file. The imaging apparatus can thus store the still image file in the same directory as the moving image file along with additionally recording the moving image, even if the imaging apparatus further receives an image capturing instruction. As a result, if a general computer reads the recording medium on which the files are recorded using the imaging apparatus according to the present exemplary embodiment, the user can easily confirm and operate the files.

The directory, the moving image files, and the still image files are thus located in the recording medium 141 as illustrated in FIG. 4 by performing the above-described process.

FIG. 4 illustrates a state in which the directories and the files are stored in a memory card (i.e., the recording medium 141) on which the imaging apparatus 100 has recorded the files according to the present exemplary embodiment.

Referring to FIG. 4, "DCIM" directory is located in a root directory, in which "100PHOTO", "110PHOTO" and "111PHOTO" directories are each located. If the imaging apparatus 100 performs image capturing twice in one day in the movie digest mode according to the flowcharts illustrated in FIGS. 2 and 3, the imaging apparatus 100 stores the moving image files and the still image files in a state such as indicated by the "110PHOTO" directory. More specifically, the moving image file "MDG_000.1MOV" in the "110PHOTO" directory is a moving image file including the moving image data stored in the memory 104 at timing in which the still image files "IMG_0002.JPG" and "IMG_000.3JPG" are captured.

Further, if the directory is in a state in which 900 files can be additionally recorded, the imaging apparatus 100 continuously records the files in the directory in which the imaging apparatus 100 has been recording the files, even when the imaging apparatus 100 captures images in the movie digest mode on a specific day. For example, the imaging apparatus 100 can record 900 or more files in the "110PHOTO" directory when recording the moving image files "MDG_0004.MOV" and "MDG_1099.MOV". The imaging apparatus 100 thus stores the moving image files "MDG_0004.MOV" and "MDG_1099.MOV" in "110PHOTO".

However, if "IMG_1350.JPG" is the last file recorded in the "110PHOTO" directory, and the imaging apparatus 100 records in the movie digest mode on the next day, 900 or more files cannot be recorded in the "110PHOTO" directory. The imaging apparatus 100 thus generates a new directory, i.e., "111PHOTO", and newly stores the moving image file "MDG_0001.MOV".

As described above, the imaging apparatus 100 stores in the directory storing the moving image file captured in the movie digest mode, the still image of the still image data associated with the moving image file which is acquired according to the same image capturing instruction.

If the imaging apparatus 100 is in the normal moving image shooting mode or still image shooting mode, the control unit 101 stores the still image file and the moving image file in the directory determined in step S320 illustrated in FIG. 3, without performing the process of step S350. In other words, in the normal moving image shooting mode or still image shooting mode, the control unit 101 does not generate the new directory (as in step S370), if the number of files that can be stored in the directory designated to record the files is less than or equal to a predetermined threshold value.

The process performed in step S340 illustrated in FIG. 3 will be described in detail below. In step S340, upon receiving the image capturing instruction, the control unit 101 records and adds (connects) the moving image data stored in the memory 104 to the moving image data in the existing moving image file recorded in the recording medium 141. As a result, the control unit 101 can generate one file which can reproduce the moving image of the moving image data acquired by image capturing, continuously after the moving image in the existing moving image file. In other words, "MDG_0001.MOV" becomes the moving image file including the moving image data stored in the memory 104 at the timing in which the still image files "IMG_0002.JPG" and "IMG_0003.JPG" have been captured.

Such a process will be described below with reference to FIGS. 5A, 5B, 5C, and 6. FIG. 6 is a flowchart illustrating a control process of the imaging apparatus when performing editing to connect (additively record) the moving image data. FIGS. 5A, 5B, and 5C illustrate the states of the moving image file in the recording medium 141 respectively, corresponding to each step illustrated in FIG. 6. The process illustrated in FIG. 6 is realized by the control unit 101 controlling each block in the imaging apparatus 100.

In step S610 illustrated in FIG. 6, the control unit 101 controls the recording and reproduction unit 140 to record in a free space in the recording medium 141, the moving image data of the predetermined length of time stored in the memory 104 in step S202 illustrated in FIG. 2. Since the imaging apparatus 100 employs the FAT file system, the control unit 101 records the moving image data in empty clusters according to the basic rule.

FIG. 5A illustrates a recorded state of the specific moving image file before the imaging apparatus records in the recording medium 141 the moving image data stored in the memory 104. Referring to FIG. 5A, the moving image data of the specific moving image file is recorded in cluster numbers 1 and 2, and the header of the specific moving image file is recorded in cluster 3. The moving image file is thus recorded in cluster number 1 to cluster number 3. In a FAT area, the cluster numbers are recorded in the FAT entry to indicate that the file is recorded in an order of cluster number 3, cluster number 1, and cluster number 2. More specifically, "1" is recorded in the FAT entry of cluster number 3, "2" in the FAT entry of cluster number 1, and "FF" indicting an end of the file in the FAT entry of cluster number 2. The specific moving image file thus reads out the data from the recording medium in the order of cluster number 3, cluster number 1, and cluster number 2.

FIG. 5B illustrates the state in which the moving image data of the predetermined length of time stored in the memory 104 in step S202 illustrated in FIG. 2 is recorded in the recording medium 141. Referring to FIG. 5B, the moving image data of the predetermined length of time is recorded in cluster numbers 4 and 5. In such a state, the FAT entries in the FAT area indicate that the moving image data of the predetermined length of time is recorded in the cluster numbers 4 and 5, separately from the specific moving image file recorded in the cluster number 1 to cluster number 3.

The process of step S620 will be described below. If the process of step S610 has been started, the process of step S620 may be started even when the process of step S202 has not been completed.

After the control unit 101 starts recording the moving image data of the predetermined length of time stored in the memory 104, the control unit 101 analyzes the moving image data of the specific moving image file recorded in the recording medium 141 and identifies the connecting position. According to the present exemplary embodiment, the connecting position is set subsequent to the moving image data of the specific moving image file. Since longer time becomes necessary to read out or analyze the file as the size of the specific moving image file increases, it may take time to identify the connecting position.

In step S630, the control unit 101 controls the recording and reproduction unit 140 to rewrite the FAT entry to connect (additionally record) to the specific moving image file the moving image data of the predetermined length of time recorded in the recording medium 141. More specifically, as illustrated in FIG. 5C, the state in which the end of the specific moving image file is in cluster number 2 is changed, so that cluster numbers 4 and 5 are read after cluster number 2. The FAT entry of cluster number 2 is thus changed from "FF" indicating the file end to "4", so that cluster number 4 is read which is the head of the clusters in which the new moving image data is recorded.

In step S640, the control unit 101 reads the file header of the specific moving image file and edits the file header to also record the information for managing the new moving image data. The control unit 101 then records the edited file header in the recording medium 141. For example, the management information indicating where the data corresponding to a starting position of a specific frame or a specific GOP of the moving image is located in the moving image file is recorded in the file header. The moving image file which has been edited by the control unit 101 to connect the moving image data as illustrated in FIG. 5C includes cluster numbers 1, 2, 3, 4, and 5. The moving image file is recorded in the order of cluster number 3, cluster number 1, cluster number 2, cluster number 4, and cluster number 5. The process then returns to step S222 illustrated in FIG. 2.

The imaging apparatus 100 may perform the processes of step S620 to step S640 illustrated in FIG. 6 in parallel to the processes of step S222 and step S223, and in parallel to the processes of step S201 to step S204 in which the moving image data acquired in subsequent image capturing is temporarily stored. Since the imaging apparatus 100 has previously recorded in the recording medium 141 the moving image data stored in the memory 104 by performing the process of step S202, the area in the memory 104 for temporarily storing the moving image data is opened. In such a case, the imaging apparatus 100 may start storing in the memory 104 the moving image data acquired in step S201. In other words, the moving image data becomes storable in the memory 104 since the imaging apparatus 100 records in the recording medium 141 the moving image data in the memory 104.

As described above, according to the present exemplary embodiment, when the user inputs the image capturing instruction, the control unit 101 in the imaging apparatus 100 controls the recording and reproduction unit 140. The recording and reproduction unit 140 then records in the recording medium 141 the moving image data of the predetermined length of time stored in the memory 104 up to when the user has input the instruction (i.e., performs the process of step S610).

After the imaging apparatus 100 has started recording the moving image data of the predetermined length of time stored in the memory 104, the control unit 101 analyzes the moving image data in the specific moving image file recorded in the recording medium 141 and identifies the connecting position (i.e., performs the process of step S620). The control unit 101 edits the FAT area and the header to edit the specific moving image file, so that the moving image data of the predetermined length of time is reproduced continuously following the connecting position.

According to the present exemplary embodiment, if the imaging apparatus is to connect the newly captured moving image data to the moving image data in the existing moving image file recorded in the recording medium, the imaging apparatus performs the following process. The imaging apparatus records in the recording medium the new moving image data temporarily stored in the RAM, before analyzing the connecting position in the existing moving image file. The moving image data storing area in the memory 104 is thus opened. As a result, the imaging apparatus can store the subsequent moving image data in the moving image data storing area in the memory 104 before identifying the connecting position in the existing moving image file. It can thus prevent the time to capture the next moving image data from becoming long.

The conditions for the control unit 101 determining that the moving image data cannot be additively recorded in step S330 illustrated in FIG. 3 will be described below. According to the present exemplary embodiment, the imaging apparatus basically records and adds the new moving image data to the moving image data in the existing moving image file. However, the imaging apparatus does not additively record the new moving image data when the conditions described below are satisfied.

<The existing moving image file to which the new moving image data is to be appended is protected>

If the specific moving image file "MDG_000X.MOV" recorded in the recording medium 141 is protected, it is likely that the user does not desire modification of the file. The control unit 101 thus determines the moving image data cannot be additively recorded.

<The file size exceeds a predetermined size when the new moving image data is additively recorded>

The recording medium 141 is managed according to the FAT file system as described above. In such a case, if the recording medium 141 is managed according to FAT 32 file system, the file cannot be read if the size of one file becomes 4 GB or greater. As a result, if the moving image file to which the new moving image data is to be added and recorded will exceed 4 GB in subsequent image capturing, the control unit 101 determines the moving image data cannot be additively recorded.

<There is an abnormality in the gop structure of the existing moving image file to which the new moving image data is to be appended>

If there is an abnormality in the GOP structure as a result of checking the specific moving image file "MDG_000X.MOV" stored in the recording medium 141 to which the new moving image data is to be additionally recorded, the moving image data to be additionally recorded may be affected by such abnormality. The control unit 101 thus determines the moving image data cannot be additively recorded.

<The file to which the new moving image data is to be additionally recorded does not exist>

The file name of the moving image captured in the movie digest mode is indicated as "MDG_000X.MOV", in which the identifier "MDG" is followed by a four-digit sequential number. However, if there is no moving image file including the identifier "MDG", the moving image file captured in the movie digest mode does not exist, so that the control unit 101 determines the moving image data cannot be additively recorded. Further, if the moving image file last recorded in the movie digest mode, whose file name is recorded in a non-volatile memory (not illustrated) in the imaging apparatus 100, does not exist, the control unit 101 determines the moving image data cannot be additively recorded.

<The shooting date of the moving image file to which the moving image data is to be additively recorded is different from the date set on the imaging apparatus (i.e., the condition described in step S330)>

If the moving image data captured on the same date in the movie digest mode are to be additively recorded sequentially, the moving image data is recorded in a different moving image file when the shooting date is different. In such a case, the control unit 101 determines the moving image data cannot be additively recorded.

<An area setting associated with the moving image file to which the moving image data is to be additively recorded is different from the area set on the imaging apparatus>

If the moving image data captured in the same area in the movie digest mode are to be additively recorded sequentially, the moving image data is recorded in a different moving image file when there is a change in the area in which the moving image is captured. In such a case, the control unit 101 determines the moving image data cannot be additively recorded. For example, the area information may be positional information acquired using a global positioning system (GPS) unit. Further, information on a "country" selected by the user when the user sets a clock to the imaging apparatus may be used.

<The information on the imaging apparatus associated with the moving image file to which the moving image data is to be additively recorded is different from the imaging apparatus used in capturing the new moving image data>

There may be a case where only the moving image data captured in the movie digest mode using the same imaging apparatus is to be additively recorded. In such a case, the imaging apparatus confirms whether identification information of the imaging apparatus associated with the moving image file stored in the recording medium to which the moving image data is to be additionally recorded, matches the imaging apparatus to be used in imaging capturing. If the identification information does not match the imaging apparatus to be used in capturing, the control unit 101 determines the moving image data cannot be additionally recorded.

<A moving image recording setting is not the same as the moving image recording setting of the existing moving image file to which the moving image data is to be additively recorded>

According to the present exemplary embodiment, if the imaging apparatus is to additively record the new moving image data to the existing moving image file, the resulting moving image may not be seamlessly reproduced when the frame rate, the image size, the GOP configuration, or the moving image coding method is changed within the moving image. As a result, if the moving image recording setting of the moving image data of the existing moving image is not the same as the new moving image data, the control unit 101 determines the moving image data cannot be additively recorded. The information on the frame rate, the image size, the GOP configuration, and the moving image coding method is recorded in the file header of the existing moving image file.

<The speech recording setting is not the same as the speech recording setting of the existing moving image file to which the moving image data is to be additively recorded>

According to the present exemplary embodiment, if the imaging apparatus is to additively record the new moving image data to the existing moving image file, the resulting moving image may not be seamlessly reproduced when a sampling rate, a number of channels, bit depth, or a speech coding method is changed within the moving image. As a result, if the speech recording setting of the moving image data to the existing moving image is not the same as that of the new moving image data, the control unit 101 determines the moving image data cannot be additively recorded. The information on the sampling rate, the number of channels, the bit depth, and the speech coding method is recorded in the file header of the existing moving image file.

<There is an attachment/detachment history record of the recording medium 141>

At the time of activation of the imaging apparatus 100, an attachment/detachment history of the recording medium 141 after the imaging apparatus 100 has last captured the moving image in the continuous moving image shooting mode may be remaining in the non-volatile memory (not illustrated). In such a case, the control unit 101 determines the moving image data cannot be additively recorded. The control unit 101 determines as described above to reduce the possibility of the moving image file becoming destructed by additive recording. More specifically, the computer may edit the moving image file "MDG_000X.MOV" stored in the recording medium 141 to which the moving image data is to be additively recorded, so that the image size is changed. The moving image file may thus be destructed by additively recording the moving image data. To prevent such a problem, the control unit 101 compares the shooting date information of "MDG_000X.MOV", recorded in the file header, and time information of the attachment/detachment history remaining in the non-volatile memory. The information about the time of capturing the initial image data is recorded in the file header from among the moving image data in a plurality of scenes recorded in the moving image file "MDG_000X.MOV".

<The moving image reproduction time exceeds a predetermined time by additively recording>

The user of the imaging apparatus 100 may not desire to perform image capturing exceeding a predetermined time (e.g., 30 minutes). In such a case, if the reproduction time of the moving image data in the moving image file to which the moving image data is to be additively recorded exceeds 30 minutes as a result of newly capturing an image in the continuous moving image shooting mode, the control unit 101 determines the moving image data cannot be additively recorded. For example, the control unit 101 reads out the reproduction time of the moving image file written in the file header to which the moving image data is to be additively recorded. If the read reproduction time is 29 minutes and 58 seconds, the control unit 101 determines the moving image data cannot be additively recorded.

<The number of files in the directory recorded in the moving image file to which the moving image data is to be additively recorded is greater than or equal to a predetermined number>

In the imaging apparatus 100, the number of still image files and the moving image files to be recorded in the recording medium 141 is defined based on the DCF standard. According to the DCF standard, a maximum of 9999 files can be recorded in one directory. According to the present exemplary embodiment, when the imaging apparatus 100 performs image capturing, the imaging apparatus newly generates the still image file. The imaging apparatus 100 thus may not be able to record the still image in the directory storing the moving image file to which the moving image data is to be additively recorded. In such a case, if the imaging apparatus 100 stores the related still image in a different directory as the moving image file to which the moving image data is to be additively recorded, it may become difficult for the user to view the images. To solve such a problem, the imaging apparatus 100 records the moving image as a new file without additively recording to the existing moving image file, and stores the moving image in a new directory. According to the present exemplary embodiment, the upper limit of the number of files is set to 9999. However, the upper limit may be 999 files, 900 files, or 100 files.

Further, if the control unit 101 cannot normally check the files, such as when the recording medium 141 or the existing moving image file is broken, the control unit 101 determines the moving image data cannot be additively recorded.

Furthermore, according to the present exemplary embodiment, the imaging apparatus connects (additively records) the moving image data captured in the movie digest mode on the same day to the moving image file. However, the imaging apparatus may connect the moving image data captured within 12 hours to the moving image file.

As described above, according to the present exemplary embodiment, the imaging apparatus acquires the still image data and the moving image data in one image capturing instruction. The imaging apparatus then additively records the moving image data in the moving image file to be additively recorded. The imaging apparatus can store in the same directory the moving image file including the moving data and the still image file including the still image data, corresponding to the specific image capturing instruction.

More specifically, if the moving image file to which the moving image data is to be additively recorded is included in a specific directory, the imaging apparatus additively records the moving image in such moving image file. Further, the imaging apparatus stores in the same directory the still image file including the still image data acquired at the same time. On the other hand, if the moving image file to which the moving image data is to be additively recorded is not included in a specific directory, the imaging apparatus records the acquired moving image data as the moving image file to which the moving image data corresponding to subsequent image capturing is to be additively recorded. Further, the imaging apparatus stores the still image file of the still image data acquired at the same time.

In such a case, if the directory in which the moving image file and the still image file are to be stored cannot record files of a predetermined number or more (according to the present exemplary embodiment, 900 or more files), the imaging apparatus generates a new directory. The imaging apparatus then records the moving image file and the still image file in the new directory.

In performing such a process, when the imaging apparatus is in a mode for acquiring and recording the moving image data and the still image data by performing image capturing, if the imaging apparatus records the moving image data as a new moving image file instead of additively recording the moving image data, the imaging apparatus can store at that time, at least 900 (i.e., a predetermined number of) still image files in the same directory. In other words, the imaging apparatus can store the moving image file including the moving data and the still image file including the still image data, corresponding to the specific image capturing instruction, in the same directory. As a result, according to the present exemplary embodiment, if the user reads by a general computer the recording medium recorded employing the above-described imaging apparatus, the user can easily confirm and operate the files.

Further, according to the present exemplary embodiment, if the imaging apparatus is to store as a file in the directory the still image generated according to a record instruction, and the number of files exceeds the upper limit of the number that can be stored in the directory, the imaging apparatus performs the following process. The imaging apparatus newly generates a directory and without additively recording moving image data, stores the moving image data in the new directory as the moving image file in which the moving image corresponding to the subsequent image capturing instruction is to be additively recorded. Further, the imaging apparatus stores the still image file including the still image data in the new directory. As a result, the imaging apparatus can store in the same directory the moving image file including the moving data and the still image file including the still image data, acquired at the same time in one image capturing.

According to the present exemplary embodiment, the imaging apparatus includes a general compact digital camera, a digital single-lens reflex camera, a camcorder, and a cellular phone. Further, the techniques of the present invention may be applied to devices other than the imaging apparatus, such as a personal computer connected to a camera.

Other Embodiments

The above-described exemplary embodiment of the present invention may be achieved by software executed on a computer (i.e., a CPU or a MPU) in a system or an apparatus.

A computer program supplied to the computer for implementing the above-described exemplary embodiment on the computer thus also realizes the present invention. In other words, the computer program which implements the functions of the above-described exemplary embodiment constitutes the present invention.

The computer program for realizing the above-described exemplary embodiment may be in any form, as long as the computer program is computer-readable. For example, the computer program may be configured as an object code, a program executed by an interpreter, or script data to be supplied to an operating system (OS), however, the exemplary embodiment is not limited to these programs. The computer program for realizing the above-described exemplary embodiment may be supplied to the computer in a storage medium or via wired or wireless communication. The storage medium for supplying the program may be a magnetic storage medium such as the flexible disk, the hard disk, or the magnetic tape, or an optical/opto-magnetic storage medium such as the MO, the CD, or the DVD, or the non-volatile semiconductor memory.

The computer program may be supplied via wired or wireless communication, employing a server on a computer network. In such a case, a data file (i.e., a program file) which can be the computer program that constitutes the present invention is stored in the server. The server supplies to a client computer accessing the server the program file in an executable format or as a source code by downloading the program file to the client computer. The program file may be divided into a plurality of segment files and distributed to be installed in different servers. In other words, a server apparatus providing to the client computer the program file for realizing the above-described exemplary embodiment constitutes the present invention.

Further, the computer program for realizing the above-described exemplary embodiment that has been encrypted may be distributed by storing in a storage medium. A user satisfying a predetermined condition may then be supplied with key information for decrypting the encrypted the computer program, to allow installation of the computer program to a computer owned by the user. The key information may be supplied by downloading from a home page via the Internet. Furthermore, the computer program for realizing the above-described exemplary embodiment may use a function of the OS previously operating the computer. Moreover, a portion of the computer program for realizing the above-described exemplary embodiment may be firmware such as an extension board attached to the computer, or executed by the CPU arranged in the extension board.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments For this purpose, the program is provided to the computer for example via a network or from a recording medium of various types serving as the memory device (e.g., computer-readable medium)

While the present invention has been described with reference to exemplary embodiments, it is to be understood that the invention is not limited to the disclosed exemplary embodiments. Each feature disclosed in the description, and (where appropriate) the claims and drawings may be provided independently or in any appropriate combination.

What is claimed is:

1. An image data recording apparatus comprising:
    a moving image acquisition unit configured to acquire moving image data;
    a still image acquisition unit configured to acquire still image data;
    a reception unit configured to receive a still image recording instruction from a user; and
    a control unit configured to perform control so as to record, in a recording medium, still image data acquired by the still image acquisition unit, and moving image data acquired by the moving image acquisition unit, in response to the still image recording instruction,
    wherein the control unit is configured to perform control so as to, in response to the still image recording instruction, in a case where a moving image file that satisfies a predetermined condition is already recorded in the recording medium, additively record the moving image data in the moving image file that satisfies the predetermined condition, and in a case where the moving image file that satisfies the predetermined condition is not recorded in the recording medium, create a moving image file and record the moving image data in the created moving image file.

2. The image data recording apparatus according to claim 1, wherein the moving image acquisition unit acquires moving image data captured by an image capturing unit, and
    wherein the control unit performs control so as to record, in the recording medium, moving image data captured before the reception unit receives the still image recording instruction, in response to the still image recording instruction.

3. The image data recording apparatus according to claim 1, wherein the control unit performs control so as to record the still image data and the moving image data in a same directory, in response to the still image recording instruction.

4. The image data recording apparatus according to claim 1, wherein the moving image acquisition unit acquires moving image data captured by an image capturing unit,
    wherein the still image acquisition unit acquires still image data captured by the image capturing unit, and further comprising,
    wherein the image data recording apparatus further comprises date and time acquisition unit configured to acquire shooting date and time, and
    wherein the control unit adds shooting date and time of a last frame of the moving image data to the moving image data.

5. The image data recording apparatus according to claim 1, wherein the control unit performs control so as to, in a case where moving image data previously acquired in response to a still image recording instruction is recorded in a moving image file recorded in the recording medium, record, in the moving image file, moving data acquired in response to a still image recording instruction for this time.

6. The image data recording apparatus according to claim 1, wherein the control unit specifies a directory to which the moving image data and the still image data can be recorded and performs control so as to, in a case where a moving image file to which the moving image data can be additively recorded is included in the specified directory, record the moving image data in the moving image file to which the moving image data can be additively recorded, and in a case where a moving image file to which the moving image data can be additively recorded is not included in the specified directory, create a moving image file in the specified directory and record the moving image data in the created moving image file.

7. The image data recording apparatus according to claim 6, wherein the control unit specifies a directory to which the moving image data and the still image data can be recorded, based on a number of files recorded in the directory or information related to recording date and time of a file recorded in the directory.

8. The image data recording apparatus according to claim 6, wherein the control unit performs control so as to, when a moving image file to which the moving image data can be additively recorded is not included in the specified directory, in a case where files more than or equal to a predetermined number of files can be recorded in the specified directory, record the moving image data and the still image data in the specified directory, and in a case where the files more than or equal to the predetermined number of files cannot be recorded in the specified directory, record the moving image data and the still image data in a newly created directory.

9. The image data recording apparatus according to claim 1, wherein the control unit is configured to perform control so as to, in a case where shooting date of moving image data already recorded in the moving image file to which the moving image data can be additively recorded is the same as shooting date of moving image data acquired in response to the still image recording instruction, record the moving image data acquired in response to the still image recording instruction in the moving image file to which the moving image data can be additively recorded, and in a case where the shooting date of moving image data already recorded in the moving image file to which the moving image data can be additively recorded is different from the shooting date of moving image data acquired in response to the still image recording instruction, create a moving image file and record the moving image data acquired in response to the still image recording instruction in the created moving image file.

10. The image data recording apparatus according to claim 1, further comprising
an image capturing unit,
wherein the moving image acquisition unit acquires moving image data captured by the image capturing unit, and
wherein the still image acquisition unit acquires still image data captured by the image capturing unit.

11. The image data recording apparatus according to claim 10, further comprising
a setting unit configured to set a shooting mode,
wherein the control unit performs control so as to:
in a case where a first shooting mode is set, record still image data captured in response to a still image recording instruction and moving image data captured before the still image recording instruction;
in a case where a second shooting mode is set, record moving image data captured from a moving image recording start instruction to a moving image recording end instruction; and
in a case where a third shooting mode is set, record still image data captured in response to a still image recording instruction.

12. A method for controlling an image data recording apparatus comprising:
receiving a still image recording instruction from a user; and
performing control so as to record, in a recording medium, acquired still image data and acquired moving image data, in response to the still image recording instruction,
wherein the performing control performs control so as to, in a case where a moving image file that satisfies a predetermined condition is already recorded in the recording medium, additively record the moving image data in the moving image file that satisfies the predetermined condition, and in a case where the moving image file that satisfies the predetermined condition is not recorded in the recording medium, create a moving image file and record the moving image data in the created moving image file.

13. A non-transitory computer-readable storage medium storing a program for causing a computer to execute the control method according to claim 12.

* * * * *